Nov. 25, 1930.  P. C. BRUCKMANN  1,782,710
BEARING CONSTRUCTION
Filed Feb. 25, 1926

Inventor:
PETER C. BRUCKMANN,
His Attorney.

Patented Nov. 25, 1930

1,782,710

UNITED STATES PATENT OFFICE

PETER C. BRUCKMANN, OF ST LOUIS, MISSOURI, ASSIGNOR, BY MESNE ASSIGNMENTS, TO VORCLONE COMPANY, A CORPORATION OF WISCONSIN

BEARING CONSTRUCTION

Application filed February 25, 1926. Serial No. 90,462.

This invention pertains to bearing constructions and more particularly to a construction for flexible vertical bearings such as are used to mount the rotating element of centrifugal driers and the like.

In the mounting of a bearing of this type, the bearing sleeve is usually supported in a stationary support by clamping the same between a pair of rubber washers so that it may be resilient in order to relieve the strains incident to an unbalanced load in the rotating element. In accordance with the usual construction, these rubber washers are held by a clamping nut. The bearing sleeve itself is usually provided with an enlarged head providing an oil reservoir. The pulley which drives the rotating element is ordinarily mounted on the shaft above the bearing and arranged to overhang said bearing. This construction is inconvenient for the reason that with the pulley overhanging the entire bearing, it is necessary to dismount the entire rotating element before adjustments of the bearing can be made.

Furthermore, on account of the enlarged head of the bearing sleeve the same must be constructed so as to be removable from the sleeve in order to facilitate mounting and dismounting the bearing, as the clamping nut is underneath this enlarged head where it cannot be removed while the head is in place. One of the objects of this invention, therefore, is to provide an improved construction for such bearings in which the bearing sleeve and its head may be formed integrally of one casting so that leakage at the connections is eliminated. Another object is to provide for accessibility so that the bearing may be adjusted without dismounting the rotating element.

Figure 1:
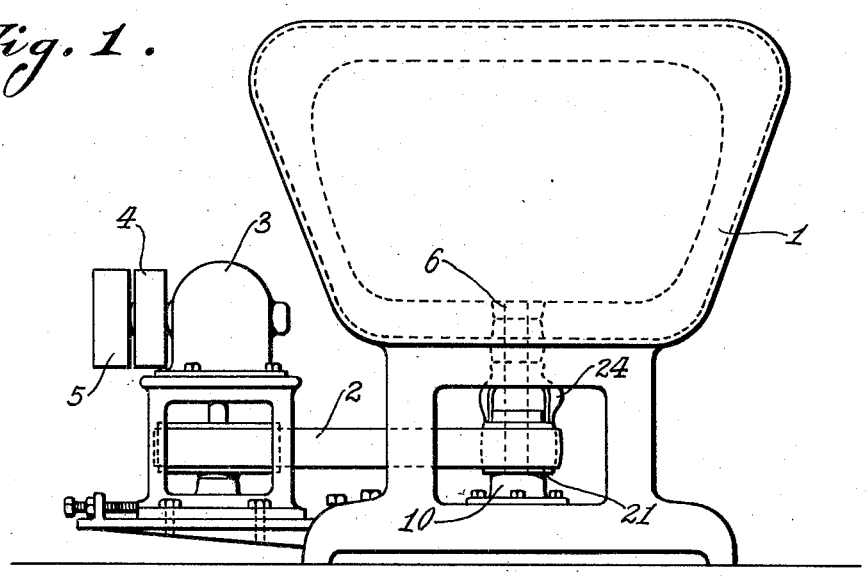
Figure 2:
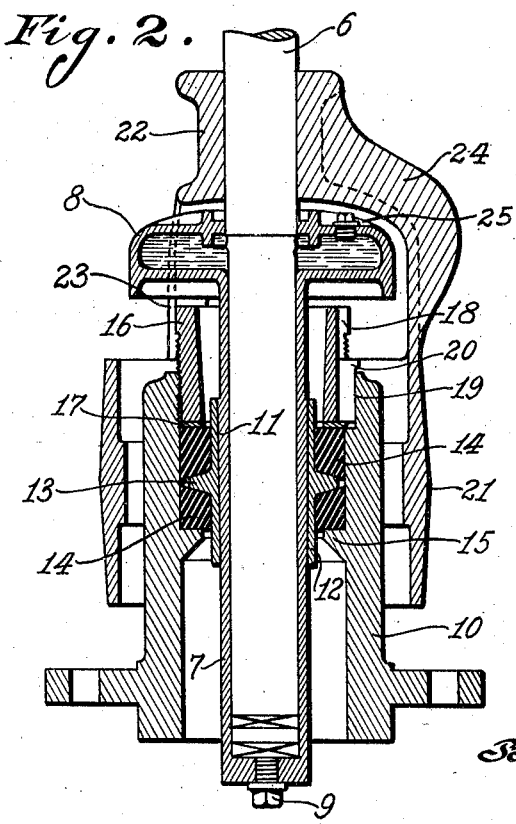
Figure 3:
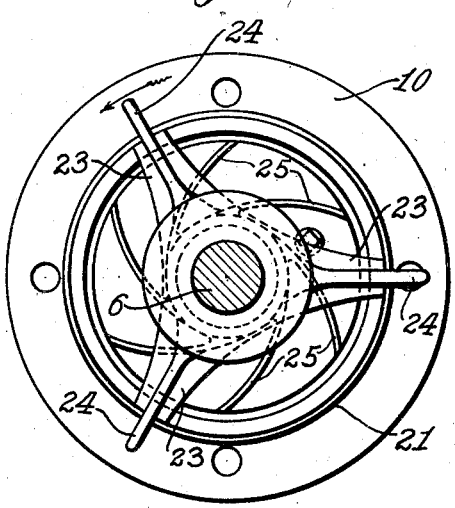

Further objects will appear from the following description taken in connection with the accompanying drawing in which Figure 1 is a view in elevation of a centrifugal drier having the bearing construction embodying this invention. Figure 2 is an enlarged vertical section of bearing, and Figure 3 is a top view of Figure 2.

Referring to the accompanying drawing, 1 designates a centrifuge which in the instance illustrated is a laundry drier. This may be driven by a belt 2 from a driving head 3, equipped with fast and loose pulleys 4 and 5 which may be belted to any suitable source of power not shown. 6 designates the shaft of the rotating element. The shaft 6 is mounted in a bearing sleeve 7 having an enlarged head 8 providing an oil reservoir. The sleeve 7 and the head 8 may be formed integrally of a single casting, and the sleeve is normally closed at the bottom but provided with a drain plug 9. The sleeve 7 is resiliently mounted in a support 10 which in turn is mounted on the base of the centrifuge.

In order to make the sleeve 7 easily removable from its mounting, said sleeve is provided with a tapered portion 11 fitting a correspondingly tapered socket 12 provided with a circumferential rib 13. The rib 13 is clamped between resilient washers 14 of rubber or other resilient material, the lower one of which rests upon a flange 15 on the interior of the support 10. These washers are clamped against the rib 13 by an adjusting nut 16, a bearing washer 17 being interposed therebetween. The nut 16 is provided at intervals therearound with keyways 18 and the support 10 is provided with a corresponding keyway 19. After adjustment of the nut 16, one of the keyways 18 is brought into registry with the keyway 19, and a key 20 is inserted to lock the nut in adjusted position.

A pulley 21 is mounted on the shaft 6 so as to overhang the bearing and its support 10 in the usual manner. This pulley, however, has improved features of construction. The hub 22 is secured to the shaft in any usual manner and is connected to the rim by a spider having a series of arms 23. The spaces between the arms 23 and above the upper edge of the pulley rim are open so as to provide access through the pulley for adjustment of the nut 16. These openings are large enough so that a suitable tool may be inserted and moved for making such adjustment.

The arms 23 are further provided each with a fin 24 outstanding from the arm so as to provide a fan. These fins operate to set up a strong draft of air when the pulley is rotating.

It will be seen that this invention provides a simple and rugged construction for an ordinary flexible bearing and one which is easy to operate. The mounting of the sleeve 7 in a separate socket 12, which latter is resiliently mounted in the bearing support, renders it possible to remove the bearing sleeve 7 without disturbing the rest of the mounting. In previous constructions the rib 13 was formed directly on the sleeve 7 so that the nut 16, being underneath the head 8, could not be removed unless said head was removable from the sleeve. In accordance with the present construction, this head and the sleeve 7 may be formed of a single casting so that the necessity for a joint between them is eliminated and there is no possibility for leakage of oil at such joint.

The pulley construction providing the open spider, renders it possible to adjust the clamping nut 16 without distributing the mounting of the rotating element, a feature which saves a great deal of time in caring for such a machine. The provision of the fan blades on the pulley provides a draft of air which may be used to cool the head 8 and thereby cool the bearing 7. By keeping the oil in the head 8 continually cool, a circulation may be set up through the bearing which assists materially in preventing undue heating thereof. The draft of air is drawn upwardly through the interior of the pulley and impinges on the under side of the head 8, after which it passes outwardly through the openings in the spider. The upper parts of the fins 24 also by disturbing the air in its path causes a draft to be directed downwardly on the top of the head 8. This draft impinges upon a series of radiating ribs 25 formed on the top of the head 8 and extending in an angular direction against the rotation of the pulley as indicated by the arrow in Figure 3.

It can be seen, therefore, that this invention accomplishes its object in providing a bearing construction of simple design which is easy to manipulate, and rugged and durable in service.

It is obvious that various changes may be made in the details of construction without departing from the spirit of this invention; it is to be understood, therefore, that this invention is not limited to the specific details shown and described.

Having thus described the invention, what is claimed is:

In a device of the character described, the combination of a vertical shaft, a bearing enclosing the lower end of the shaft and having an oil reservoir vertically above the end of the shaft, a pulley encircling the bearing below said reservoir, arms extending from the pulley across said reservoir and secured to said shaft above said reservoir, and air propelling fins on said arms, whereby air will be caused to circulate past the reservoir.

In testimony whereof I affix my signature this 23rd day of February, 1926.

PETER C. BRUCKMANN.